United States Patent
Zhang et al.

(10) Patent No.: US 10,230,981 B2
(45) Date of Patent: *Mar. 12, 2019

(54) METHOD AND APPARATUS FOR INTRA MODE CODING IN HEVC

(71) Applicant: HFI INNOVATION INC., Zhubei, Hsinchu County OT (TW)

(72) Inventors: Ximin Zhang, San Jose, CA (US); Shan Liu, San Jose, CA (US)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 122 days.

This patent is subject to a terminal disclaimer.

(21) Appl. No.: 15/150,545

(22) Filed: May 10, 2016

(65) Prior Publication Data
US 2016/0269749 A1   Sep. 15, 2016

Related U.S. Application Data

(63) Continuation of application No. 13/810,205, filed as application No. PCT/US2012/052585 on Aug. 28, 2012, now Pat. No. 9,363,511.

(Continued)

(51) Int. Cl.
*H04N 19/11* (2014.01)
*H04N 19/593* (2014.01)
(Continued)

(52) U.S. Cl.
CPC .......... *H04N 19/593* (2014.11); *H04N 19/11* (2014.11); *H04N 19/463* (2014.11); *H04N 19/50* (2014.11); *H04N 19/61* (2014.11)

(58) Field of Classification Search
CPC .............. H04N 7/32; H04N 19/00569; H04N 19/00884; H04N 19/11
See application file for complete search history.

(56) References Cited

U.S. PATENT DOCUMENTS 7,450,640 B2 * 11/2008 Kim .................. H04N 19/105
                                                       375/240.12
2003/0223495 A1 * 12/2003 Sun .................. H04N 19/197
                                                       375/240.12
(Continued)

FOREIGN PATENT DOCUMENTS

| CN | 101668202 | 3/2010 |
| CN | 103597832 | 2/2014 |
| WO | WO 2013/037489 | 3/2013 |

OTHER PUBLICATIONS

Hang, X., et al.; "Intra mode coding with fixed length binarization;" Joint Collaborative Team on Video Coding (JCT-VC) of ITU-T SG16 WP3 and ISO/IEC JTC1/SC29/WG11; Nov. 2011; pp. 1-5.

(Continued)

*Primary Examiner* — Dramos Kalapodas
(74) *Attorney, Agent, or Firm* — McClure, Qualey & Rodack, LLP

(57) ABSTRACT

A method is performed by a CODEC (coder/decoder) for Intra prediction mode processing based on multiple MPMs (most probable modes) in video coding. The method includes operations of determining a first Intra mode associated with a left neighboring block of a current block; determining a second Intra mode associated with a top neighboring block of the current block; deriving three MPMs based on the first Intra mode and the second Intra mode, and processing a current Intra mode associated with the current block according to said three MPMs. The step of deriving said three MPMs based on the first Intra mode and the second Intra mode includes: determining whether the first Intra mode is identical to the second Intra mode; and if the first Intra mode is identical to the second Intra mode, deriving said three MPMs according to whether the first Intra mode is identical to a predetermined mode.

15 Claims, 4 Drawing Sheets

Related U.S. Application Data

(60) Provisional application No. 61/533,890, filed on Sep. 13, 2011.

(51) Int. Cl.
  *H04N 19/50* (2014.01)
  *H04N 19/61* (2014.01)
  *H04N 19/463* (2014.01)

(56) References Cited

U.S. PATENT DOCUMENTS

| | | |
|---|---|---|
| 2003/0223645 A1 | 12/2003 | Sun et al. |
| 2008/0084934 A1 | 4/2008 | Agrawal |
| 2009/0147849 A1 | 6/2009 | Au |
| 2011/0038415 A1 | 2/2011 | Min et al. |
| 2011/0164677 A1 | 7/2011 | Lu et al. |
| 2011/0292994 A1* | 12/2011 | Lim .............. H04N 19/182 375/240.02 |
| 2011/0317757 A1 | 12/2011 | Coban |
| 2012/0020580 A1 | 1/2012 | Sasai et al. |
| 2012/0106629 A1 | 5/2012 | Zheng et al. |
| 2012/0177112 A1 | 7/2012 | Guo |
| 2012/0177113 A1* | 7/2012 | Guo .............. H04N 19/593 375/240.12 |
| 2012/0177118 A1 | 7/2012 | Karczewicz et al. |
| 2012/0195366 A1 | 8/2012 | Liu |
| 2012/0314766 A1* | 12/2012 | Chien .............. H04N 19/176 375/240.12 |
| 2013/0121414 A1 | 5/2013 | Yasugi et al. |
| 2014/0086323 A1* | 3/2014 | Chuang .............. H04N 19/159 375/240.12 |

OTHER PUBLICATIONS

Chuang, T.D., et al.; "Luma Intra Prediction Mode Coding;" Joint Collaborative Team on Video Coding (JCT-VC) of ITU-T SG16 WP3 and ISO/IEC JTC1/SC29/WG11; Jul. 2011; pp. 1-5.

Zou, F., et al.; "Planar Mode Mapping for Intra Mode Coding;" Joint Collaborative Team on Video Coding (JCT-VC) of ITU-T SG16 WP3 and ISO/IEC JTC1/SC29/WG11; Jul. 2011; pp. 1-6.

Francois. E., et al.; "Intra Mode Coding with 4 MPMs and Mode Ranking;" Joint Collaborative Team on Video Coding (JCT-VC) of ITU-T SG16 WP3 and ISO/IEC JTC1/SC29/WG11; Nov. 2011; pp. 1-8.

Yeo, C., et al.; "On Intra Prediction Mode Coding;" Joint Collaborative Team on Video Coding (JCT-VC) of ITU-T SG16 WP3 and ISO/IEC JTC1/SC29/WG11; Nov. 2011; pp. 1-12.

Guo, M., et al.; "The Most Probable Mode Signaling for Luma;" Joint Collaborative Team on Video Coding (JCT-VC) of ITU-T SG16 WP3 and ISO/IEC JTC1/SC29/WG11; Mar. 2011; pp. 1-4.

Zhang, X.; "Intra Mode Coding in HEVC;" ISB 978-1-4673-4405-0; IEEE2012.

* cited by examiner

| Index | 0 | 1 | 2 | 3 | 4 | 5 | 6 | 7 | 8 | 9 | 10 | 11 |
|---|---|---|---|---|---|---|---|---|---|---|---|---|
| Physical | PLA | V | H | DC | V-8 | V-4 | V+4 | V+8 | H-4 | H+4 | H+8 | V-6 |
| Index | 12 | 13 | 14 | 15 | 16 | 17 | 18 | 19 | 20 | 21 | 22 | 23 |
| Physical | V-2 | V+2 | V+6 | H-6 | H-2 | H+2 | H+6 | V-7 | V-5 | V-3 | V-1 | V+1 |
| Index | 24 | 25 | 26 | 27 | 28 | 29 | 30 | 31 | 32 | 33 | 34 | |
| Physical | V+3 | V+5 | V+7 | H-7 | H-5 | H-3 | H-1 | H+1 | H+3 | H+5 | H+7 | |

*Fig. 2*

METHOD AND APPARATUS FOR INTRA MODE CODING IN HEVC

CROSS REFERENCE TO RELATED APPLICATIONS

The present invention is a continuation of pending U.S. application Ser. No. 13/810,205, filed on Jan. 15, 2013, which is a National Phase of PCT/US2012/52585, filed on Aug. 28, 2012, which claims priority to U.S. Provisional Patent Application, Ser. No. 61/533,890, filed on Sep. 13, 2011, entitled "Methods of Intra mode coding for video compression in HEVC". The priority applications are hereby incorporated by reference in their entireties.

FIELD OF THE INVENTION

The present invention relates to video coding. In particular, the present invention relates to coding techniques associated with the Intra mode.

BACKGROUND

Intra prediction exploits spatial correlation within a picture or within a picture region. In order to improve coding efficiency, the High-Efficiency Video Coding (HEVC) standard being developed exploits block-based spatial prediction extensively. In HEVC, multiple Intra prediction modes are used to exploit spatial features and the number of Intra prediction modes depends on the block size of a Prediction Unit (PU). The size of the PU for Intra coding can be 64×64, 32×32, 16×16, 8×8, or 4×4. The number of Intra prediction modes can be as many as 35, including 33 directional prediction modes, one DC mode and one Planar mode as shown in FIG. 1A and FIG. 1B. The directions are labeled with their respective physical directions (H referring to Horizontal direction and V referring to Vertical direction) in FIG. 1A and the directions are labeled with an example of their respective Intra mode indices in FIG. 1B. The correspondences between the physical directions and the Intra mode indices are shown in FIG. 2.

In order to improve compression efficiency, a coding scheme based on most probable mode (MPM) is adopted by HEVC to encode the Intra mode syntax. According to the MPM-based coding scheme, the Intra prediction mode (or Intra mode for abbreviation) for the current block (i.e., the current PU) is predicted using the Intra prediction modes of the left neighboring block and the top neighboring block. In HEVC Test Model Version 5.0 (HM-5.0), two most probable modes are derived from the Intra prediction modes of the left neighboring block and the top neighboring block. If these two Intra prediction modes are the same or one is not available, another Intra mode (Planar or DC mode) is added as the second most probable mode. Because there is a high probability that the Intra prediction mode of the current PU is the same as one of the most probable modes, a shorter codeword is used to encode such cases. Otherwise, a longer codeword is used. In HEVC, the number of Intra prediction modes depends on the PU size as shown in Table 1. The 4×4 and 64×64 PUs only use a subset of the 35 Intra prediction modes for the luma component. For the 4×4 PU, 18 Intra prediction modes are used, which include DC mode, Planar mode, and 16 directional modes as indicated by circles in FIG. 1A and FIG. 1B. It is noted that the directional Intra mode corresponding to the H+6 direction (i.e., mode index 18) is left out of the 18 Intra modes for the 4×4 PU as indicated by a square in FIG. 1A and FIG. 1B. It is desirable to design a set of Intra mode candidates that provides full directional coverage. Furthermore, there are 33 remaining modes besides two MPMs. In order to code these 33 modes, at least six bins (bits) have to be used. Since five bins (bits) can only accommodate 32 modes in a fixed-length representation, using six bins (bits) to code the 33 remaining modes is not efficient. Accordingly, in the current HEVC (HM-5.0), the remaining modes are coded using variable length coding. Nevertheless, it is desirable to use fixed length coding to reduce system complexity if the coding efficiency can be maintained or improved. Further, it is desirable to increase the number of most probable modes so that the number of remaining modes can be reduced.

TABLE 1

| Block size | Number of Luma Mode | Luma Modes |
|---|---|---|
| 64 × 64 | 4 | 0~3 |
| 32 × 32 | 35 | 0~34 |
| 16 × 16 | 35 | 0~34 |
| 8 × 8 | 35 | 0~34 |
| 4 × 4 | 18 | 0~17 |

BRIEF SUMMARY OF THE INVENTION

A method and apparatus for Intra prediction mode encoding or decoding based on multi-level most probable modes (MPMs) are disclosed. In one embodiment according to the present invention, the method and apparatus for encoding or decoding Intra prediction mode for 4×4 prediction unit (PU) use 19 Intra mode candidates to provide full directional coverage or 35 Intra mode candidates as used by 8×8, 16×16 and 32×32 PUs. In another embodiment of the present invention, three MPMs are used for Intra mode coding. If the top neighbor and the left neighbor of a current PU have the same Intra mode, the Intra mode is assigned to the first MPM of the three MPMs. If the first MPM is DC mode, then Planar mode and Vertical mode are assigned to the second MPM and the third MPM. If the first MPM is Planar mode, then DC mode and Vertical mode are assigned to the second MPM and the third MPM. If the first MPM is neither DC mode nor Planar mode, two immediate directional neighbors of the first MPM may be assigned to the second MPM and the third MPM. Alternatively, Planar mode and DC mode may be assigned to the second MPM and the third MPM. In the case that the top neighbor and the left neighbor of a current PU have different Intra modes, the Intra mode having a smaller mode index is assigned to the first MPM and the other Intra mode is assigned to the second MPM. If none of the first and second MPMs is Planar mode, then Planar mode is assigned to the third MPM. Otherwise, if none of the first and second MPMs is DC mode, DC mode is assigned to the third MPM. Otherwise, Vertical mode is assigned to the third MPM.

In another embodiment of the present invention, encoding or decoding of the current Intra mode is according to a coding method for the remaining modes, wherein the coding method includes fixed-length coding. The coding method uses implicit derivation for the only remaining Intra mode if four Intra mode candidates and 3 MPMs are used. In the case that 19 Intra mode candidates and 3 MPMs are used, the coding method may use 4-bit fixed representation for the remaining modes. The coding method may also use 3 bits for a first group consisting of 4 selected remaining modes, 4 bits for a second group consisting of another 4 selected remaining modes, and 5 bits for a third group consisting of rest of the remaining modes. Alternatively, coding method may also use 2 bits for a first group consisting of 2 selected remaining modes, 4 bits for a second group consisting of another 2 selected remaining modes, and 5 bits for a third group consisting of rest of the remaining modes. In the case that 35 Intra mode candidates and 3 MPMs are used, the coding method may use 5-bit fixed representation for the remaining modes. The coding method may also use 3 bits for a first group consisting of 4 selected remaining modes, 5 bits for a second group consisting of another 4 selected remaining modes, and 6 bits for a third group consisting of rest of the remaining modes. Alternatively, the coding method may also use 2 bits for a first group consisting of 2 selected remaining modes, 5 bits for a second group consisting of another 2 selected remaining modes, and 6 bits for a third group consisting of rest of the remaining modes.

BRIEF DESCRIPTION OF THE DRAWINGS

FIG. 2 illustrates the correspondences between physical directions and the exemplary mode indices (as shown in FIG. 1B) of Intra prediction modes for HEVC.

DETAILED DESCRIPTION OF THE INVENTION

Figure 1A:
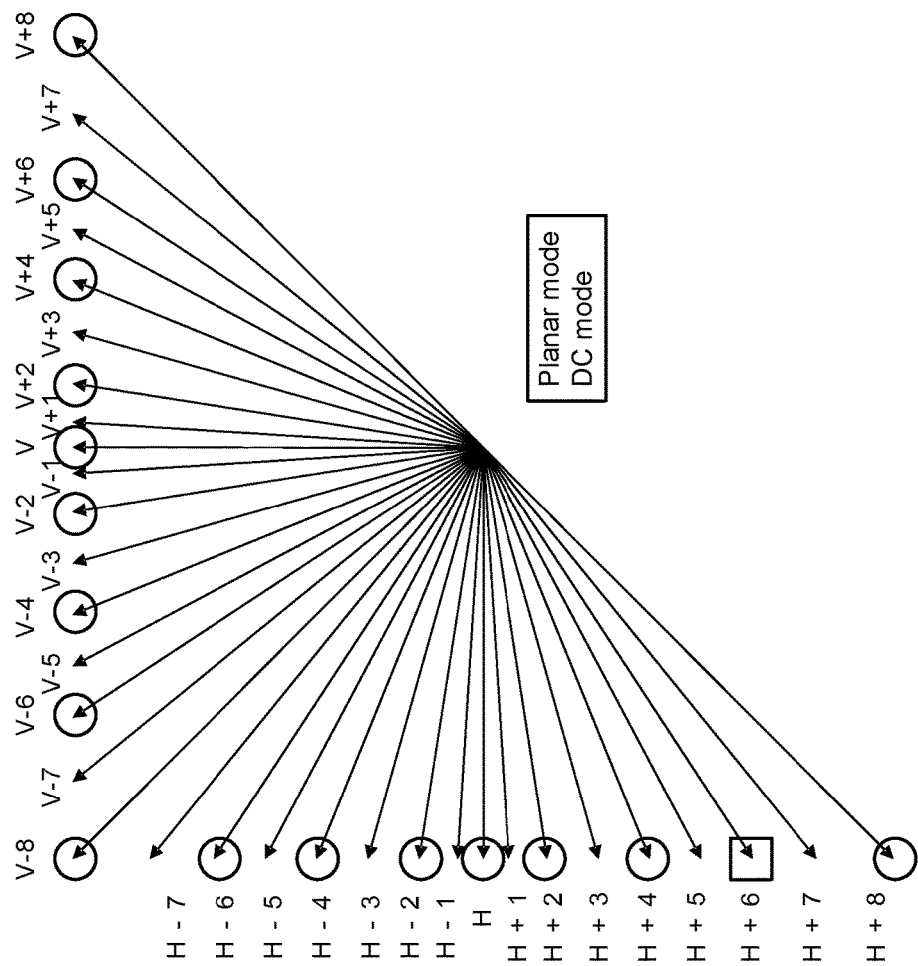
FIG. 1A illustrates the 35 Intra prediction modes for High-Efficiency Video Coding (HEVC) labeled with physical directions.
Figure 1B:
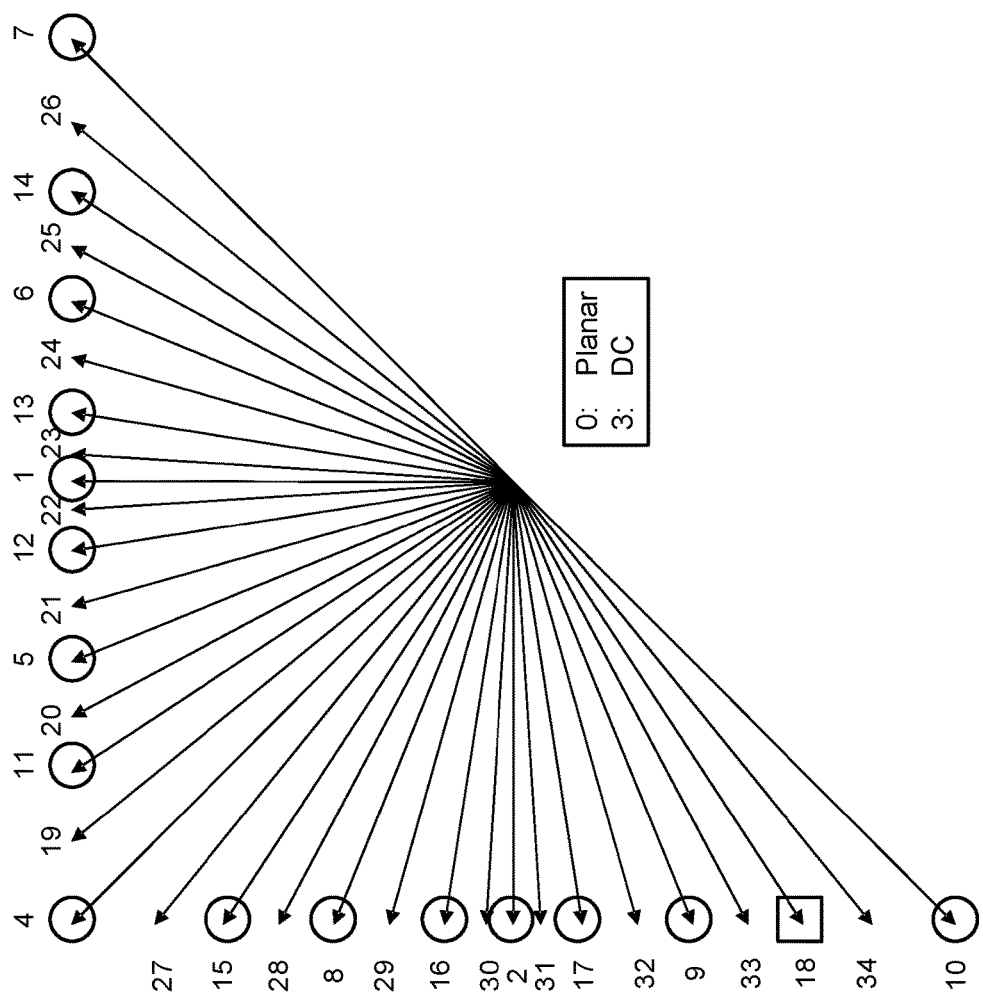
FIG. 1B illustrates the 35 Intra prediction modes for High-Efficiency Video Coding (HEVC) labeled with one example of mode indices.
Figure 3:
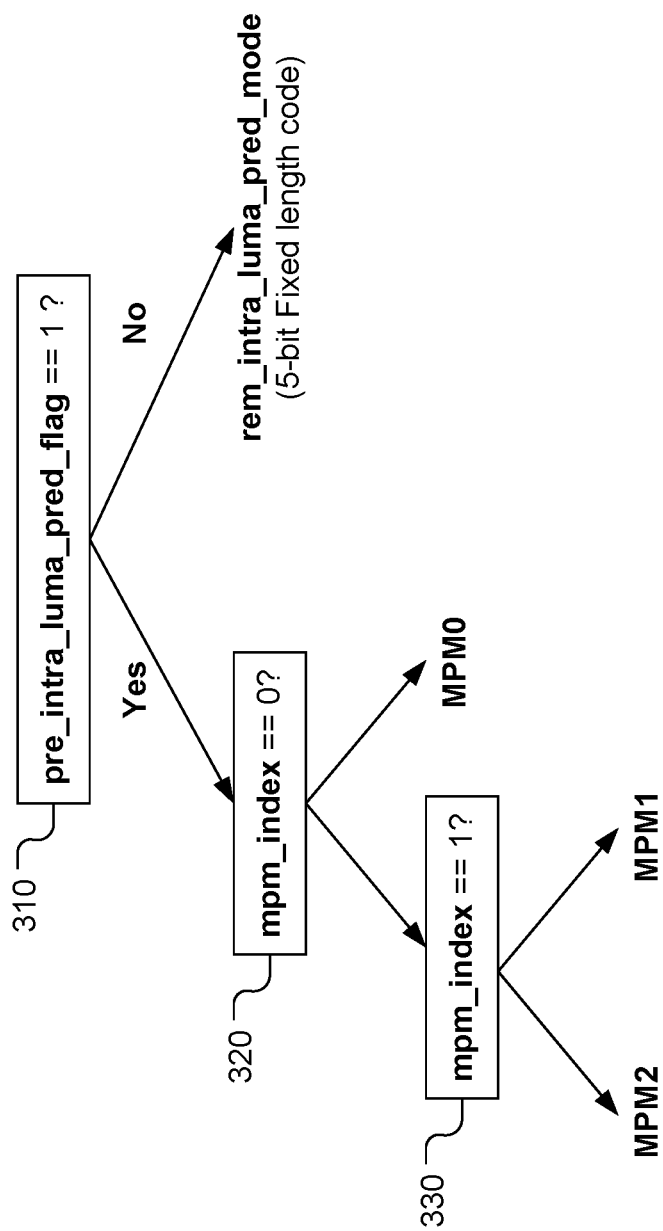
FIG. 3 illustrates an exemplary decision tree for most probable mode selection using 3 most probable modes according to an embodiment of the present invention.

As mentioned previously, 18 Intra prediction modes are used for 4×4 PU, which include DC mode, Planar mode, and 16 directional modes as indicated by circles in FIG. 1A and FIG. 1B. While the 16 directional modes are derived from the 33 directional modes by retaining one directional mode out of every two, however, Intra mode H+6 (i.e., mode index 18) is not included in the 16 directional modes. It is desirable to provide 4×4 PU with uniformly sub-sampled coverage for all directions without a missing hole in the directions. Accordingly, an embodiment of the present invention allows 19 Intra prediction modes so that a full directional coverage is achieved. For example, the 19 Intra mode candidates may include the 18 conventional Intra modes being selected for the 4×4 PU and the directional mode H+6. In other words, an embodiment according to the present invention selects Intra modes indices from 0 through 18 as the Intra mode candidates. For 8×8, 16×16 and 32×32 PUs, the same 35 candidates as shown in FIG. 1A or FIG. 1B may be used. Furthermore, the chroma Intra mode may use same number of mode candidates as the luma Intra mode. Accordingly, 19 Intra modes may be used for both luma and chroma 4×4 PUs. In yet another embodiment of the present invention, the 4×4 PU may also use 35 Intra modes for both luma and chroma components.

In another embodiment of the present invention, three MPMs are used instead of two MPMs. The use of three MPMs can be applied to PUs at all sizes including 4×4, 8×8, 32×32 and 64×64. One of the benefits of using three MPMs instead of two is the improved coding efficiency for coding remaining modes using fixed length codes in the cases of 19 Intra modes and 35 Intra modes. When three MPMs are used, there will be 16 remaining Intra modes for the case of 19 Intra mode candidates and 32 remaining Intra modes for the case of 35 Intra mode candidates. The 16 remaining Intra mode can be efficiently represented using 4-bit fixed representation. On the other hand, the 32 remaining Intra mode can be efficiently represented using 5-bit fixed representation. The use of three MPMs may also improve coding efficiency of Intra mode coding since it will increase the probability that a current Intra mode can be predicted by one of the MPMs. The derivation of three MPMs for a current PU according to an embodiment of the present invention is based on the Intra modes of the top neighbor and left neighbor of the current PU. If the Intra modes of the top neighbor and left neighbor are the same, the Intra mode for the two neighbors is selected as the first MPM. The second and third MPMs are selected according to the following method:

i. If the first MPM is Planar mode, then DC and Vertical modes are assigned to the second MPM and third MPMs;
  ii. If the first MPM is DC mode, then Planar and Vertical modes are assigned to the second MPM and third MPMs; and
  iii. If the first MPM is neither DC mode nor Planar mode, the following two schemes can be used:
    1. Scheme 1. The two immediate directional neighbors of the first MPM are selected as the second and third MPMs. For example, in the case of 35 candidates, V+1 and V−1 are selected as the second and third MPMs if Vertical mode is the first MPM. In the case of 19 candidates, V−2 and V+2 are selected as the second and third MPMs if Vertical mode is the first MPM. If the neighbor on one side of the first MPM is not available, the next immediate directional neighbor available or Planar mode is used to replace one of the two immediate directional neighbors unavailable. For example, in the case of 35 candidates, if V+8 is the first MPM, its neighbor V+9 is not available, the next immediate neighbor can be v+6 or H+7. Therefore, V+7 and H+7, or V+7 and V+6, or V+7 and Planar mode will be selected as the second MPM and the third MPM if V+8 is the first MPM; and
    2. Scheme 2. Planar mode and DC mode are selected as the second and third MPMs.

In method (i) described above, DC mode can be assign to the second MPM and Vertical mode can be assigned to the third MPM. Alternatively, DC mode can be assign to the third MPM and Vertical mode can be assigned to the second MPM. In method (ii) described above, Planar mode can be assign to the second MPM and Vertical mode can be assigned to the third MPM. Alternatively, Planar mode can be assign to the third MPM and Vertical mode can be assigned to the second MPM. In other words, the mapping from two candidate Intra modes to two MPMs (i.e., the second MPM and the third MPM) can be designed to be in any order. This mapping also applies to method (iii) described above.

If the Intra modes of the top neighbor and left neighbor are different, an embodiment selects the mode having a smaller index as the first MPM and the other mode as the second MPM. The third MPM is selected by the following method:

i. If none of first and second MPMs is Planar mode, Planar mode is selected as the third MPM;
  ii. Otherwise, if none of first and second MPMs is DC mode, DC mode is selected as the third MPM; and
  iii. Otherwise, Vertical mode is selected as the third MPM The above example illustrates one embodiment for derivation of three MPMs according to the present invention. A person skilled in the art may use other MPM derivations to practice the present invention without departing from the spirit of the present invention. For example, Horizontal mode instead of Vertical mode may be used in the above example.

In the case of three MPMs, the current mode may use one bin (bit), such as "1", to indicate if the current mode is the same as the first MPM. The current mode may use two bins (bits), such as "00" or "01", to indicate if the current mode is equal to the second MPM or the third MPM respectively.

In the case of three MPMs, the remaining modes can be coded using the same binarization, i.e., using fixed length representation, as follows:
  i. If 19 Intra mode candidates are selected, 4 bins are used for the 16 remaining modes;
  ii. If 35 Intra mode candidates are selected, 5 bins are used for the 32 remaining modes; and
  iii. If 4 Intra mode candidates are selected, the remaining mode is implicitly derived.

The method (iii) described above can be applied to 64×64 PU, where only four Intra mode candidates are used. When three MPMs are used, there will be only one remaining mode left in this case. Therefore, a method to implicitly derive the remaining mode will be more efficient for this case. While the example above uses the same binarization for all remaining modes, different binarization may also be used for the remaining modes as follows:
  i. If 19 Intra mode candidates are selected, 3 bins may be used for a group of 4 selected remaining modes, 4 bins may be used for another group of 4 selected remaining modes, and 5 bins may be used for the rest of the remaining modes (8 remaining modes in this group) in one embodiment. In another embodiment, 2 bins may be used for a group of 2 selected remaining modes, 4 bins may be used for used for another group of 2 selected remaining modes, and 5 bins may be used for the rest of the remaining modes (12 remaining modes in this group); and
  ii. If 35 Intra mode candidates are selected, 3 bins may be used for a group of 4 selected remaining modes, 5 bins may be used for another group of selected 4 remaining modes, and 6 bins may be used for the rest of the remaining modes (24 remaining modes in this group) in one embodiment. In another embodiment, 2 bins may be used for a group of 2 selected remaining modes, 5 bins may be used for used for another group of 2 selected remaining modes, and 6 bins may be used for the rest of the remaining modes (28 remaining modes in this group).

The performance of a coding system incorporating an embodiment of the present invention is compared with a reference system based on HEVC Test Model Version 4.0 (HM-4.0). The performance is measured in terms of BD rate, where a negative value implies performance improvement over the reference system. The BD rate comparison is performed by adjusting coding parameters to cause the underlying systems to result in about the same objective quality. The performance results are shown in Table 2 for 4×4 PUs with 19 Intra mode candidates. In Table 2, HE refers to High Efficiency coding configuration and LC refers to Low Complexity coding configuration. Classes A through E refer to different sets of test video. In both cases, moderate improvements for Y, U and V components are observed in most situations. The performance results are shown in Table 3 for 4×4 PUs with 35 Intra mode candidates. Again, moderate improvements are observed in most situations.

TABLE 2

|  | All Intra HE | | | All Intra LC | | |
| --- | --- | --- | --- | --- | --- | --- |
|  | Y | U | V | Y | U | V |
| Class A | −0.22% | −0.05% | −0.02% | −0.14% | −0.03% | −0.05% |
| Class B | −0.18% | 0.01% | 0.02% | −0.11% | 0.03% | 0.04% |
| Class C | −0.26% | −0.03% | −0.07% | −0.15% | −0.01% | 0.00% |
| Class D | −0.24% | −0.08% | −0.10% | −0.18% | 0.02% | −0.01% |
| Class E | −0.33% | 0.05% | 0.03% | −0.09% | −0.02% | 0.10% |
| Overall | −0.24% | −0.02% | −0.03% | −0.14% | 0.00% | 0.01% |
| Enc Time[%] | 102% | | | 104% | | |
| Dec Time[%] | 100% | | | 100% | | |

TABLE 3

|  | All Intra HE | | | All Intra LC | | |
| --- | --- | --- | --- | --- | --- | --- |
|  | Y | U | V | Y | U | V |
| Class A | −0.20% | −0.06% | 0.02% | −0.19% | 0.03% | −0.07% |
| Class B | −0.22% | 0.01% | 0.03% | −0.19% | −0.02% | 0.01% |
| Class C | −0.39% | −0.04% | −0.02% | −0.36% | −0.05% | −0.05% |
| Class D | −0.32% | 0.04% | 0.07% | −0.33% | 0.04% | 0.00% |
| Class E | −0.35% | 0.13% | 0.08% | −0.23% | 0.07% | 0.10% |
| Overall | −0.29% | 0.01% | 0.03% | −0.26% | 0.01% | −0.01% |
| Enc Time[%] | 106% | | | 108% | | |
| Dec Time[%] | 100% | | | 100% | | |

The results in Table 2 and Table 3 show that the encoding time is slightly increased. Accordingly, a fast Intra mode decision method is developed to improve computational efficiency for the encoder side. The performance results are shown in Table 4 for 4×4 PUs with 19 Intra mode candidates. The performance results are shown in Table 5 for 4×4 PUs with 35 Intra mode candidates. The results in Table 4 and Table 5 show that the encoding time is improved while the BD rate improvement is maintained.

TABLE 4

|  | All Intra HE | | | All Intra LC | | |
| --- | --- | --- | --- | --- | --- | --- |
|  | Y | U | V | Y | U | V |
| Class A | −0.20% | −0.07% | −0.04% | −0.12% | −0.04% | −0.06% |
| Class B | −0.15% | −0.02% | 0.00% | −0.06% | −0.05% | −0.01% |
| Class C | −0.20% | −0.08% | −0.11% | −0.05% | −0.08% | −0.05% |
| Class D | −0.17% | −0.10% | −0.11% | −0.08% | −0.06% | −0.06% |
| Class E | −0.30% | 0.06% | 0.03% | −0.05% | −0.03% | 0.05% |
| Overall | −0.20% | −0.05% | −0.04% | −0.07% | −0.05% | −0.03% |
| Enc Time[%] | 98% | | | 98% | | |
| Dec Time[%] | 100% | | | 100% | | |

TABLE 5

|  | All Intra HE | | | All Intra LC | | |
| --- | --- | --- | --- | --- | --- | --- |
|  | Y | U | V | Y | U | V |
| Class A | −0.18% | −0.07% | −0.03% | −0.17% | −0.01% | −0.04% |
| Class B | −0.18% | −0.05% | −0.02% | −0.13% | −0.06% | −0.06% |
| Class C | −0.33% | −0.08% | −0.11% | −0.26% | −0.14% | −0.13% |
| Class D | −0.24% | −0.02% | −0.04% | −0.22% | −0.03% | −0.07% |
| Class E | −0.32% | 0.10% | 0.13% | −0.19% | −0.02% | 0.10% |
| Overall | −0.24% | −0.03% | −0.02% | −0.19% | −0.05% | −0.05% |
| Enc Time[%] | 102% | | | 102% | | |
| Dec Time[%] | 100% | | | 100% | | |

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software code, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method performed by a CODEC (coder/decoder) for Intra prediction mode processing based on multiple MPMs (most probable modes) in video coding, the method comprising:

determining a first Intra mode associated with a left neighboring block of a current block;

determining a second Intra mode associated with a top neighboring block of the current block;

deriving three MPMs for the current block based on the first Intra mode and the second Intra mode, wherein the step of deriving said three MPMs based on the first Intra mode and the second Intra mode comprises:

determining whether the first Intra mode is identical to the second Intra mode;

if a result of the determination whether the first Intra mode is identical to the second Intra mode shows that the first Intra mode is identical to the second Intra mode, further determining whether the first Intra mode is identical to a predetermined prediction mode; and deriving said three MPMs based on a result of the determination whether the first Intra mode is identical to the predetermined prediction mode; and processing a current Intra mode associated with the current block according to said three MPMs;

wherein the step of deriving said three MPMs comprises:

if the result of the determination whether the first Intra mode is identical to the predetermined prediction mode shows the first Intra mode is not identical to the predetermined prediction mode, assigning the first Intra mode to a first MPM of said three MPMs, and assigning directional prediction modes of two immediate directional neighbors of the first MPM to a second MPM and a third MPM of said three MPMs;

wherein the step of deriving said three MPMs based on the first Intra mode and the second Intra mode further comprises:

if the first Intra mode is not identical to the second Intra mode, then:

assigning the first Intra mode to one of a first MPM and a second MPM of said three MPMs;

assigning the second Intra mode to the other one of the first MPM and the second MPM of said three MPMs; and assigning a Planar mode, a DC mode or a Vertical mode to a third MPM of said three MPMs, wherein the first Intra mode is assigned to the first MPM, and the second Intra mode is assigned to the second MPM, wherein the step of assigning the Planar mode, the DC mode or the Vertical mode to the third MPM of said three MPMs comprises:

if neither the first MPM nor the second MPM is equal to the Planar mode, assigning the Planar mode to the third MPM;

if either the first MPM or the second MPM is equal to the Planar mode and neither the first MPM nor the second MPM is equal to the DC mode, then the DC mode is assigned to the third MPM; and if either the first MPM or the second MPM is equal to the Planar mode and either the first MPM or the second MPM is equal to the DC mode, then the Vertical mode is assigned to the third MPM;

wherein the step of processing the current Intra mode associated with the current block according to said three MPMs further comprising:

determining a remaining mode set comprising a plurality of remaining modes other than said three MPMs;

when the current Intra mode is not identical to any of sad three MPMs, processing the current Intra mode according a coding method for the remaining mode set, wherein the coding method includes fixed-length coding.

2. The method of claim 1, wherein the predetermined prediction mode comprises a Planar mode and a DC mode.

3. The method of claim 1, wherein the step of deriving said three MPMs comprises:

if the first Intra mode is identical to the predetermined prediction mode, assigning a Planar mode, a DC mode and a Vertical mode as said three MPMs.

4. The method of claim 3, wherein the Planar mode is assigned to a first MPM of said three MPMs, the DC mode is assigned to a second MPM of said three MPMs, and the Vertical mode is assigned to a third MPM of said three MPMs.

5. The method of claim 3, wherein the DC mode is assigned to a first MPM of said three MPMs, the Planar mode is assigned to a second MPM of said three MPMs, and the Vertical mode is assigned to a third MPM of said three MPMs.

6. The method of claim 1, wherein if one of the two immediate directional neighbors is not available, said one of the two immediate directional neighbors is replaced by a directional prediction modes of an available next immediate directional neighbor or the Planar mode.

7. The method of claim 1, wherein one of the first Intra mode and the second Intra mode having a smaller mode index is assigned to the first MPM, and one of the first Intra mode and the second Intra mode having a larger mode index is assigned to the second MPM.

8. The method of claim 1, wherein a 1-bit syntax element is used to indicate whether the current Intra mode for the current block is equal to a first MPM of said three MPMs.

9. The method of claim 1, wherein a 2-bit syntax element is used to indicate whether the current Intra mode for the current block is equal to a second MPM of said three MPMs or a third MPM of said three MPM.

10. The method of claim 1, wherein the current block, the top neighboring block and the left neighboring block correspond to prediction units (PUs).

11. The method of claim 1, wherein said processing the current Intra mode corresponds to encoding the current Intra mode or decoding the current Intra mode.

12. The method of claim 1, wherein the coding method uses 5-bit fixed representation for the remaining mode set.

13. An apparatus for Intra prediction mode processing based on multiple MPMs (most probable modes), the apparatus comprising:
at least one circuit configured to:
determine a first Intra mode associated with a left neighboring block of a current block;
determine a second Intra mode associated with a top neighboring block of the current block;
derive three MPMs based on the first Intra mode and the second Intra mode by:
determining whether the first Intra mode is identical to the second Intra mode;
if a result of the determination whether the first Intra mode is identical to the second Intra mode shows that the first Intra mode is identical to the second Intra mode, further determining whether the first Intra mode is identical to a predetermined prediction mode; and
deriving said three MPMs based on a result of the determination whether the first Intra mode is identical to the predetermined prediction mode; and
process a current Intra mode associated with the current block according to said three MPMs;
wherein the deriving of said three MPMs comprises: if the result of the determination whether the first Intra mode is identical to the predetermined prediction mode shows the first Intra mode is not identical to the predetermined prediction mode, assigning the first Intra mode to a first MPM of said three MPMs, and assigning directional prediction modes of two immediate directional neighbors of the first MPM to a second MPM and a third MPM of said three MPMs;
wherein the deriving of said three MPMs based on the first Intra mode and the second Intra mode further comprises:
if the first Intra mode is not identical to the second Intra mode, then:
assigning the first Intra mode to one of a first MPM and a second MPM of said three MPMs;
assigning the second Intra mode to the other one of the first MPM and the second MPM of said three MPMs; and
assigning a Planar mode, a DC mode or a Vertical mode to a third MPM of said three MPMs, wherein the first Intra mode is assigned to the first MPM, and the second Intra mode is assigned to the second MPM, wherein the assigning of the Planar mode, the DC mode or the Vertical mode to the third MPM of said three MPMs comprises:
if neither the first MPM nor the second MPM is equal to the Planar mode, assigning the Planar mode to the third MPM;
if either the first MPM or the second MPM is equal to the Planar mode and neither the first MPM nor the second MPM is equal to the DC mode, then the DC mode is assigned to the third MPM; and
if either the first MPM or the second MPM is equal to the Planar mode and either the first MPM or the second MPM is equal to the DC mode, then the Vertical mode is assigned to the third MPM;
wherein the at least one circuit is configured to process the current Intra mode associated with the current block according to said three MPMs by:
determining a remaining mode set comprising a plurality of remaining modes other than said three MPMs;
when the current Intra mode is not identical to any of sad three MPMs, processing the current Intra mode according a coding method for the remaining mode set, wherein the coding method includes fixed-length coding.

14. The apparatus of claim 13, wherein the predetermined prediction mode comprises a Planar mode and a DC mode.

15. The apparatus of claim 14, wherein the at least one circuit is further configured to assign a Planar mode, a DC mode and a Vertical mode as said three MPMs in response to the first Intra mode being identical to the predetermined prediction mode.

* * * * *